US011320686B2

(12) United States Patent
Kim et al.

(10) Patent No.: US 11,320,686 B2
(45) Date of Patent: May 3, 2022

(54) OPTICAL FILM FOR DISPLAY DEVICE AND DISPLAY DEVICE HAVING THE SAME

(71) Applicant: Samsung Display Co., Ltd., Yongin-si (KR)

(72) Inventors: Dae Won Kim, Hwaseong-si (KR); Yukihiro Miyazawa, Anyang-si (KR); Seung Hee Lee, Hwaseong-si (KR); Kyung Hwan Jeon, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 120 days.

(21) Appl. No.: 16/837,977

(22) Filed: Apr. 1, 2020

(65) Prior Publication Data
US 2020/0348557 A1  Nov. 5, 2020

(30) Foreign Application Priority Data

Apr. 30, 2019  (KR) .................. 10-2019-0050863

(51) Int. Cl.
*G02F 1/1335* (2006.01)

(52) U.S. Cl.
CPC .. *G02F 1/133504* (2013.01); *G02F 1/133514* (2013.01); *G02F 1/133528* (2013.01); *G02F 1/133531* (2021.01)

(58) Field of Classification Search
CPC .................................. G02F 1/133504
See application file for complete search history.

(56) References Cited

U.S. PATENT DOCUMENTS

| 8,884,858 | B2 | 11/2014 | Park |
| 9,904,093 | B2 | 2/2018 | Jang et al. |
| 2006/0014085 | A1 | 1/2006 | Nakajima et al. |
| 2014/0098335 | A1* | 4/2014 | Kamada ............ G02F 1/134309 |
| | | | 349/142 |
| 2016/0334556 | A1* | 11/2016 | Wu .......................... H01L 33/60 |
| 2017/0003547 | A1* | 1/2017 | Tochigi ............. G02F 1/133606 |
| 2017/0352839 | A1* | 12/2017 | Kim ........................ H01L 51/56 |

FOREIGN PATENT DOCUMENTS

| KR | 10-2005-0074610 | 7/2005 |
| KR | 10-2007-0067335 | 6/2007 |
| KR | 10-2016-0116162 | 10/2016 |

* cited by examiner

*Primary Examiner* — Edmond C Lau
(74) *Attorney, Agent, or Firm* — H.C. Park & Associates, PLC

(57) ABSTRACT

An optical film for a display device includes: a base layer; a pattern layer disposed on the base layer and having a repeating pattern of valleys and peaks; a plurality of first elongated scattering members disposed on upper surfaces of the valleys; and a cover layer having a shape that is complementary to and coupled with the repeating pattern of valleys and peaks, with the elongated scattering members being disposed between the pattern layer and the cover layer.

16 Claims, 24 Drawing Sheets

OPTICAL FILM FOR DISPLAY DEVICE AND DISPLAY DEVICE HAVING THE SAME

CROSS REFERENCE TO RELATED APPLICATION

This application claims priority from and the benefit of Korean Patent Application No. 10-2019-0050863, filed on Apr. 30, 2019, which is hereby incorporated by reference for all purposes as if fully set forth herein.

BACKGROUND

Field

Exemplary implementations of the invention relate generally to an optical film and a display panel including the same and, more specifically, to an optical film including a patterned layer and a display device including the optical film.

Discussion of the Background

Display devices have become more and more important as multimedia technology evolves. Accordingly, a variety of types of display devices such as liquid-crystal display (LCD) devices and organic light-emitting display (OLED) devices are currently used.

Among display devices, a liquid-crystal display device is one of the most broadly used flat panel display devices. The liquid-crystal display device includes two substrates on which electrodes for generating electric field such as pixel electrodes and common electrodes are formed, and a liquid-crystal layer interposed between the two substrates. Voltage is applied to the electrodes for electric field to form electric field in the liquid-crystal layer, such that the orientation of the liquid crystals contained in the liquid-crystal layer is aligned and the polarization of incident light is controlled, to display images.

The liquid-crystal display device may have poor visibility when it is viewed from the side, compared with the front. In order to improve visibility on the sides, the liquid-crystal display device may include an optical film including a high-refractive index pattern layer and a low-refractive index pattern layer for improving the visibility.

The above information disclosed in this Background section is only for understanding of the background of the inventive concepts, and, therefore, it may contain information that does not constitute prior art.

SUMMARY

Optical films for display devices and display devices including the same constructed according to the principles and exemplary implementations of the invention are capable of improving visibility by using elongated scattering members, which may take the form of rod-like scatterers. For example, the rod-like scatterers prevent or at least suppress the light diffraction pattern from being recognized. Also, the rod-like scatterers may improve the side viewing angle of the optical films and the display devices.

Additional features of the inventive concepts will be set forth in the description which follows, and in part will be apparent from the description, or may be learned by practice of the inventive concepts.

According to one or more embodiments, an optical film for a display device includes: a base layer; a pattern layer disposed on the base layer and having a repeating pattern of valleys and peaks; a plurality of first elongated scattering members disposed on upper surfaces of the valleys; and a cover layer having a shape that is complementary to and coupled with the repeating pattern of valleys and peaks, with the elongated scattering members being disposed between the pattern layer and the cover layer.

Each of the peaks may have a width equal to or greater than a width of each of the valleys, and the pattern layer may have a refractive index higher than a refractive index of the cover layer.

The elongated scattering members may have a longitudinal axis whose length is different from a length of a shorter axis thereof.

The elongated scattering members may include first rod-like scatterers having elliptical cross sectional shapes.

The length of the shorter axis of the first elongated scattering members may be less than a width of each of the valleys.

The longitudinal axis of the elongated scattering members may be disposed generally parallel to a longitudinally extending direction of the valleys.

The elongated scattering members may have a refractive index in a direction of the longitudinal axis that is different from that of at least one of the pattern layer and the cover layer.

The elongated scattering members may have a refractive index that is less than a refractive index of the pattern layer.

The cover layer further may include second elongated scattering members, and the second elongated scattering members may be disposed in a region extending from upper surfaces of the peaks to an upper surface of the cover layer.

The second elongated scattering members may have a longitudinal axis whose length is different from a length of a shorter axis of the second elongated scattering members.

The longitudinal axis of the second elongated scattering members may be disposed generally parallel to a longitudinally extending direction of the valleys.

The second elongated scattering members may have a refractive index in a direction of the longitudinal axis that is different from that of the cover layer.

According to one or more embodiments, a display device includes: a display panel; a first polarizing plate disposed on an upper surface of the display panel; a second polarizing plate disposed on a lower surface of the display panel; a backlight unit disposed to transmit light to the second polarizing plate; and an optical film disposed on the first polarizing plate. The optical film includes: a pattern layer disposed on the first polarizing plate and having a repeating pattern of valleys and peaks, a plurality of first elongated scattering members disposed on upper surfaces of the valleys, and a cover layer having a shape complementary to and coupled with the pattern layer with the plurality of first elongated scattering members being disposed between the pattern layer and the cover layer.

The first polarizing plate may include light transmission axis in a first direction, and the second polarizing plate may include a light transmission axis in a second direction intersecting the first direction.

The first elongated scattering members may have a longitudinal axis whose length different from a length of a shorter axis thereof.

The longitudinal axis of the first elongated scattering members may be generally parallel to the light transmission axis of the first polarizing plate in the first direction.

The longitudinal axis of the first elongated scattering members may be disposed generally parallel to a longitudinally extending direction of the valleys.

The first elongated scattering members may have a refractive index in the longitudinal axis direction that is different from that of at least one of the pattern layer and the cover layer.

The display device may further include a scattering layer including second elongated scattering members and a resin layer on the cover layer.

The second elongated scattering members may have a longitudinal axis whose length is different from a length of a shorter axis thereof, and the second elongated scattering members may have a refractive index in a direction of the longitudinal axis that is different from a refractive index of the resin layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
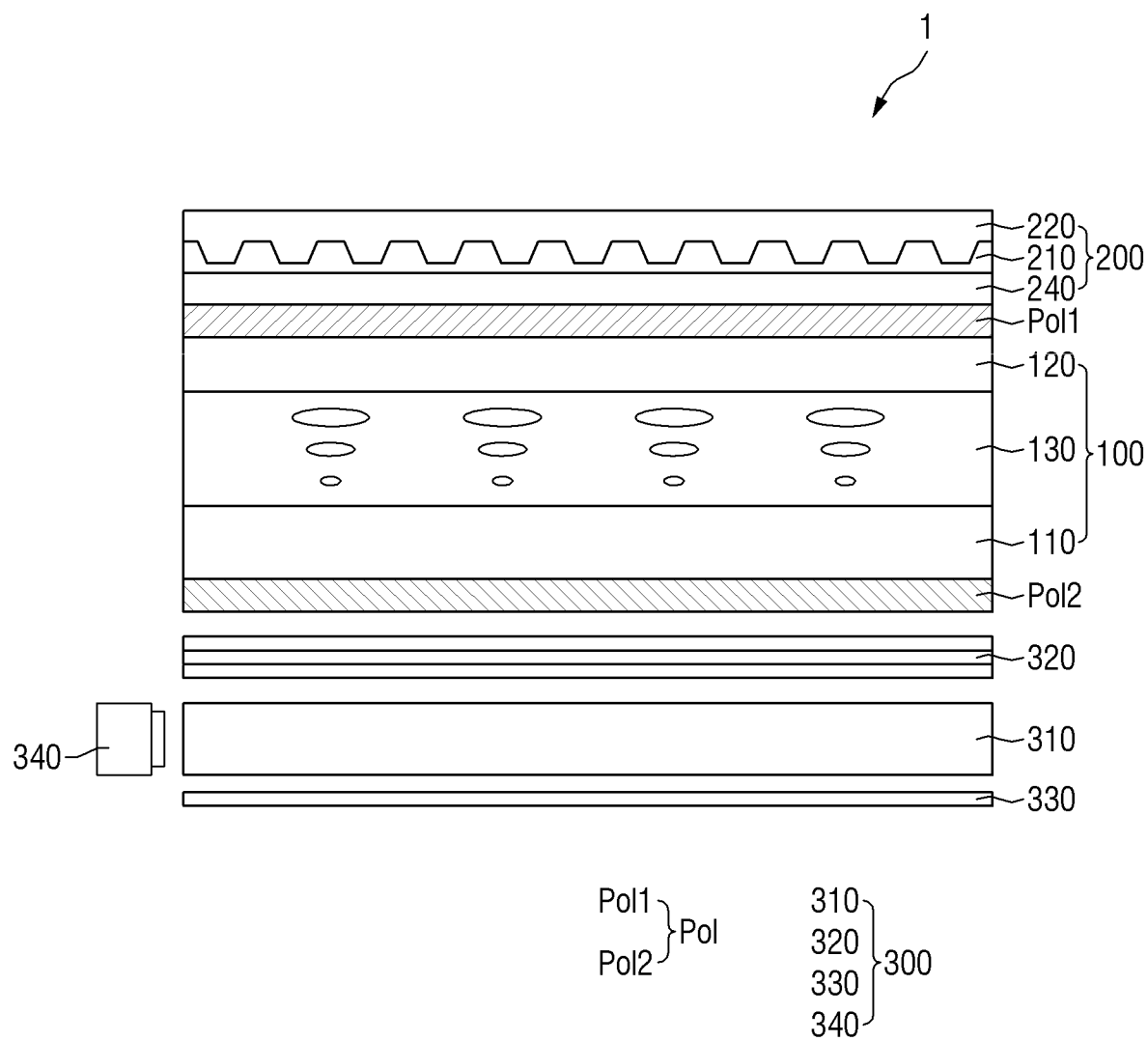
FIG. 1 is a cross-sectional view of an exemplary embodiment of a liquid-crystal display device including an optical film constructed according to the principles of the invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a cross-sectional view of an exemplary embodiment of a liquid-crystal display device including an optical film constructed according to the principles of the invention.

Figure 2:
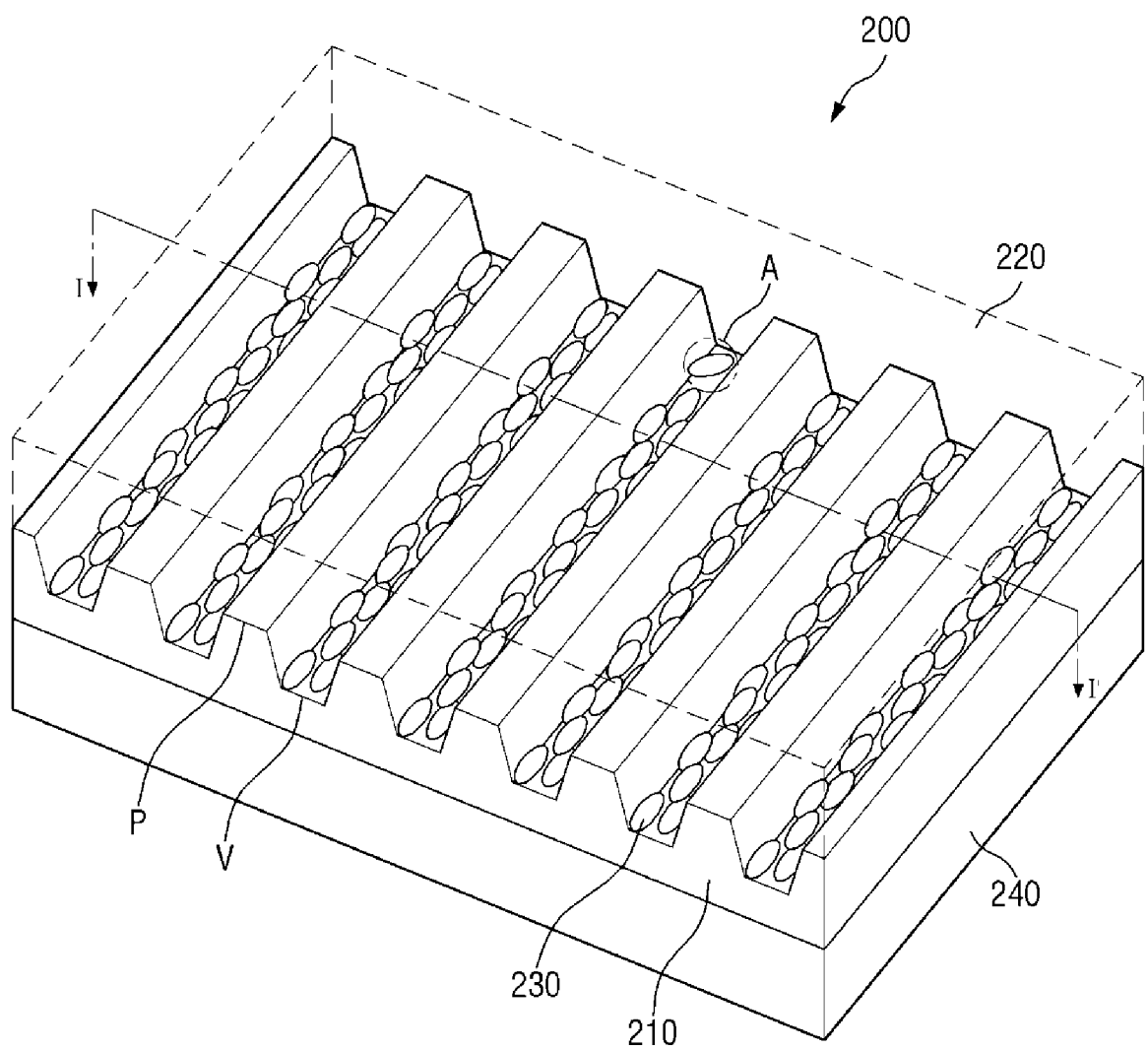
FIG. 2 is a perspective view of an exemplary embodiment of the optical film of FIG. 1.
Figure 3:
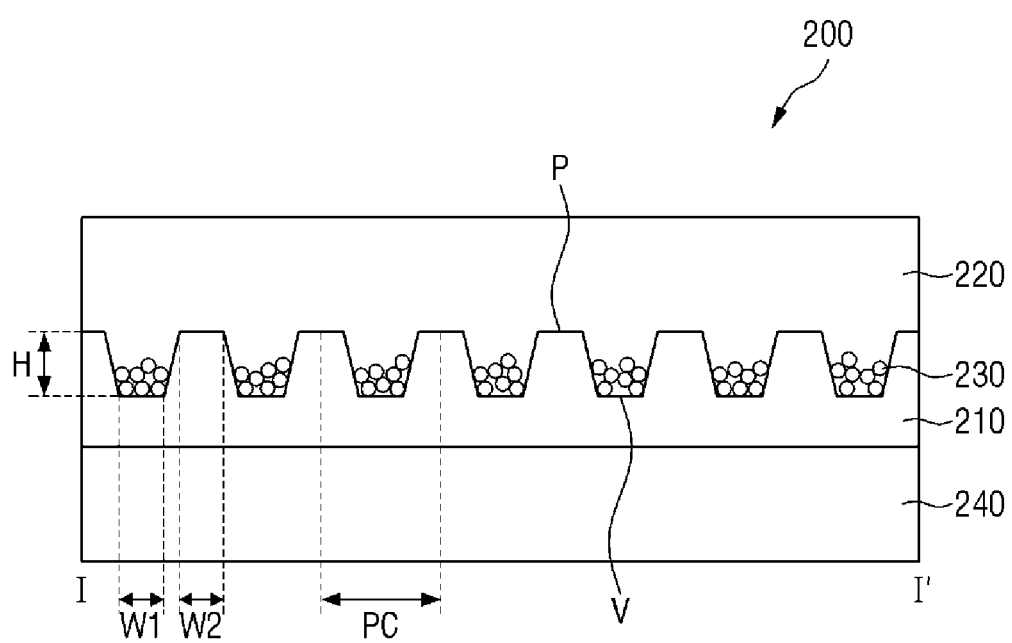
FIG. 3 is a cross-sectional view taken along line I-I' of FIG. 2.

FIG. 2 is a perspective view of an exemplary embodiment of the optical film of FIG. 1. FIG. 3 is a cross-sectional view taken along line I-I' of FIG. 2.

Referring to FIGS. 1 to 3, a liquid-crystal display device 1 may include a display panel 100, polarizing plates Pol disposed on/under the display panel 100, an optical film 200 disposed on the display panel 100, and a backlight unit 300 disposed under the display panel 100.

The display panel 100 may include a first substrate such as an array substrate 110, a second substrate such as a color filter substrate 120, and a liquid-crystal layer 120 formed in an even cell gap between the array substrate 110 and the color filter substrate 120. The array substrate 110 and the color filter substrate 120 face each other and are attached together, such that the cell gap is maintained.

A common electrode and a pixel electrode are formed in the display panel 100 in which the array substrate 110 and the color filter substrate 120 are attached together to apply an electric field to the liquid-crystal layer 130. By adjusting the voltage of a data signal applied to the pixel electrode when voltage is applied to the common electrode, the liquid-crystal molecules in the liquid-crystal layer 130 are rotated by the dielectric anisotropy according to the electric field between the common electrode and the pixel electrode. In this manner, light is transmitted or blocked in the pixels individually, so that characters or images are displayed.

In order to adjust the voltage of the data signal applied to the pixel electrode in each of the pixels, a switching element such as a thin-film transistor TFT is disposed in each of the pixels.

The polarizing plates Pol are attached on/under the display panel 100, respectively. A lower polarizing plate Pol2 disposed between the backlight unit 300 and the display panel 100 polarizes light having passed through the backlight unit 300, and an upper polarizing plate Pol1 disposed between the display panel 100 and the optical film 200 polarizes light having passed through the display panel 100.

Figure 7:
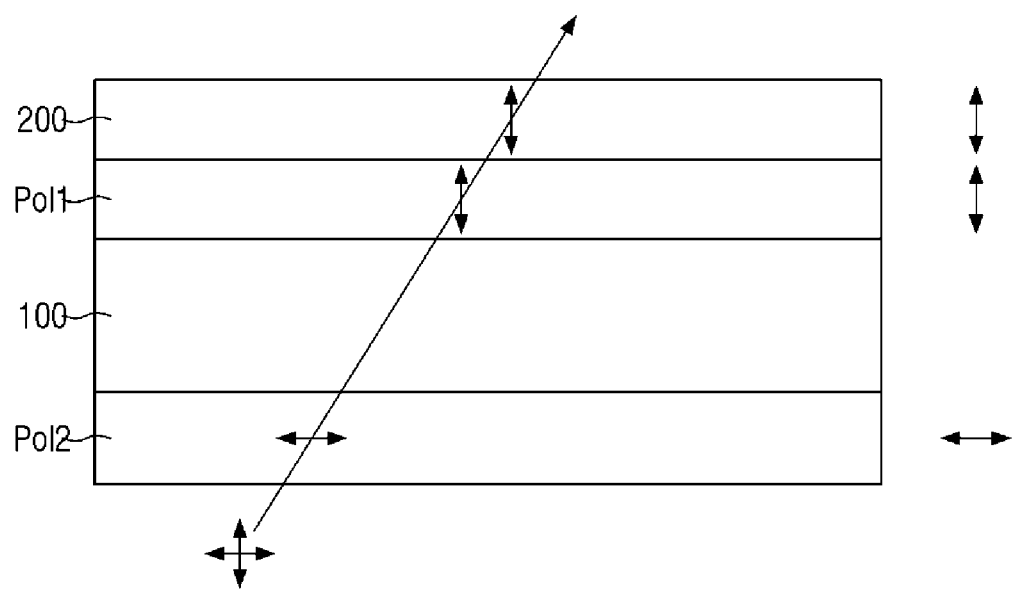
FIG. 7 is a diagram conceptually illustrating a light transmission axis and a path of exiting light in the display device of FIG. 1.

When natural light having vibration planes in all directions of 360 degrees is incident on the lower polarizing plate Pol2 which is a typical polarizing plate, it transmits only light having a certain vibration plane while absorbs the other light, to obtain polarized light. FIG. 7 shows an example where the lower polarizing plate Pol2 has a light transmission axis in the left-right direction. In this example, the upper polarizing plate Pol1 may have a light transmission axis in the up-and-down direction.

Typically, the polarizing plates Pol use a polarizer having a light-absorbing property to divide light into a polarization component parallel to the incident surface and a polarization component perpendicular to the incident surface so that linearly polarized light can be obtained by the polarizer. To this end, an appropriate material is selected, and it is processed into the form of a film suitable for the application, thereby achieving uniform polarization and high polarization efficiency.

For example, a polyvinyl alcohol (PVA) film treated with iodine may be used as the polarizer. In addition, a triacetate cellulose (TAC) film or acrylic film, for example, polymethyl methacrylate (PMMA) film having excellent transparency, ultraviolet ray absorbing property and durability as well as stability for dimensions and abrasion resistance against deformation may be used as a protective layer as an internal substrate for protecting the PVA film. It is, however, to be understood that the present disclosure is not limited thereto.

Referring back to FIGS. 1 to 3, the backlight unit 300 for providing light to the display panel 100 may include at least one of an edge-lit backlight unit and a direct-lit backlight unit depending on the position of light sources 340.

For an edge-lit backlight unit, the light sources 340 are disposed on one side of the display panel 100 to provide light. Specifically, in an edge-light backlight unit 300, a plurality of light sources 340 is disposed on one side of a light guide plate 310, and a reflector 330 is disposed on the back surface of the light guide plate 310.

The light emitted from the light sources 340 is incident on the side surface of the light guide plate 310 of a transparent material, and the reflector 330 disposed on the back surface of the light guide plate 310 may reflect light transmitted to the back surface of the light guide plate 310 toward an optical sheet 320 on the upper surface of the light guide plate 310. In this manner, it is possible to reduce the loss of light and improve the uniformity. For example, the optical sheet 320 may include a diffusion sheet, a prism sheet, and a protective sheet.

Hereinafter, the optical film 200 for improving the side viewing angle will be described in detail.

The optical film 200 may be disposed on the upper polarizing plate Pol1. The optical film 200 may include a pattern layer 210 including valleys V and peaks P, a cover layer 220 having a complementary shape and being coupled to the pattern layer 210, elongated scattering members, and a base layer 240. The elongated scattering members may take the form of quantum dots, rod-like scatterers, or any other element capable of diffracting light according to the principles discussed herein. For convenience, the illustrated embodiments depict elongated diffracted members in the form of rod-like scatterers 230, which are disposed in the valleys V of the pattern layer 210.

The pattern layer 210 may be formed on the base layer 240. The pattern layer 210 may diffuse the light reaching the interface between the pattern layer 210 and the cover layer 220 to increase the diffusion effect of the light.

The pattern layer 210 may have a higher refractive index than that of the cover layer 220. For example, the difference between the refractive index of the pattern layer 210 and the refractive index of the cover layer 220 may be 0.20 or less, specifically 0.10 to 0.20. Within the above range, the effect of improving light diffusion and visibility can be increased, and the effect of diffusing polarized light can be increased. The pattern layer 210 may have a refractive index of 1.50 or more, specifically, 1.50 to 1.70. Preferably, the refractive index of the pattern layer 210 may be 1.61. Within the above range, the effect of diffusing light can be increased. The pattern layer 210 may be formed of, but is not limited to, an UV-curable composition containing at least one of a (meth) acrylic resin, a polycarbonate resin, a silicone resin and an epoxy resin.

As shown in FIG. 2, the cross section of the shape formed by valleys V and the peaks P of the pattern layer 210 may be in an inverted trapezoidal shape. However, the shape of the cross section formed by the valleys V and the peaks P is not limited thereto, and may include a curved surface including a spherical surface, a parabolic surface, an ellipsoidal surface, a hyperboloid shape and an amorphous shape, and a prism pattern shape including triangle to decagon. The shape of the cross section formed by the valleys V and the peaks P serves as a lens to diffuse the light incident on the interface between the pattern layer 210 and the cover layer 220 in different directions depending on the different positions where the light has reached. Although FIG. 2 shows the optical film 200 having a smooth cross section formed by the valleys V and the peaks P, but cross section may include concave and convex portions to further increase the diffusion effect.

The aspect ratio of the valleys V may be 1.0 or less, specifically 0.7 to 1.0. The aspect ratio refers to the ratio of the maximum height to the maximum width (maximum height/maximum width) of an optical structure. In the above range, the contrast ratio on the side and the viewing angle on the sides can be improved. The maximum width W1 of a substantially planar surface (hereinafter, maximum width W1) of each of the valleys V may be 15 μm or less, specifically 5 to 10 μm. The maximum height H of each of the valleys V may be 15 μm or less, specifically 5 to 10 μm. In the above ranges of width and height, a diffusion effect can be achieved. The sum of the maximum widths of the valleys V may be 40% to 60%, specifically 45% to 55% of the overall width of the pattern layer 210. In the above ranges, it is possible to improve the contrast ratio and luminance uniformity on the sides and improve the viewing angle on the sides. By arranging the valleys V to form repeating units, the effect of diffusing light can be increased. Specifically, the length of each repeating unit of the valleys V may be less than 20 μm, specifically, 10 to 20 μm. In the above range, the effects of converging and diffusing light can be increased. Although FIG. 2 shows an optical film in which the valleys V have the same aspect ratio, maximum width and maximum height, a pattern having different aspect ratios, maximum widths or maximum heights may be formed in the optical film.

Each of the peaks P may be formed between every two of the valleys V. Light reaching the peaks P can be totally reflected off the valleys V and emitted so that the light can be diffused. The width W2 of a substantially planar surface (hereinafter, width W2) of each of the peaks P may be equal to or larger than the maximum width W1 of each of the valleys V (W2≥W1). The ratio W1/W2 of the maximum width W1 to the width W2 may be 1.0 or less, specifically 0.5 to 1.0. The width W2 of each of the peaks P may be 10 μm or less, specifically 5 to 10 μm. In the above ranges of ratio and width, the effect of diffusing light can be achieved. Although FIG. 2 shows the optical film having the same width W2 of the peaks P, an optical film having different widths of peaks may also be employed.

The rod-like scatterers 230 may be easily stacked in the valleys V of the pattern layer 210 randomly. The rod-like scatterers 230 may be arranged in a single layer in the valleys V as shown in FIG. 2 for convenience of illustration, or in several rows at multiple layers as shown in FIG. 3. The rod-like scatterers 230 may diffract light incident through the pattern layer 210 and/or the cover layer 220 so that the diffracted light exits.

The rod-like scatterers 230 may be formed of one or more of polyimide (PI) resin, polyetherimide (PEI) resin, polyethylene terephthalate (PET) resin, polycarbonate (PC) resin, polymethylmethacrylate (PMMA) resin, polystyrene (PS) resin, styrene-acrylonitrile copolymer (SAN) resin, silicon-acryl resin.

The refractive index of the rod-like scatterers 230 may be different from the refractive index of the pattern layer 210 and the refractive index of the cover layer 220. For example, the refractive index of the rod-like scatterers 230 may be smaller than the refractive index of the pattern layer 210 and may be larger than that of the cover layer 220. In such case, the refractive index of the rod-like scatterers 230 may be 1.0 to 1.6. Preferably, the refractive index of the rod-like scatterers 230 may be 1.49. It is, however, to be understood that the refractive index of the rod-like scatterers 230 is not limited thereto. For example, the refractive index of the rod-like scatterers 230 may be greater than the refractive index of the pattern layer 210 and that of the cover layer 220. In such case, the refractive index of the pattern layer 210 may be 1.3 to 1.6, and the difference in refractive index between the pattern layer 210 and the cover layer 220 may be 0.20 or less, specifically 0.10 to 0.20. The refractive index of the scatterers 230 may be 1.5 to 1.7. A change in the viewing angle of the liquid-crystal display device 1 as the refractive index of the rod-like scatterers 230 varies from the refractive index of the pattern layer 210 and the refractive index of the cover layer 220 will be described later in detail with reference to FIG. 7.

Figure 4:
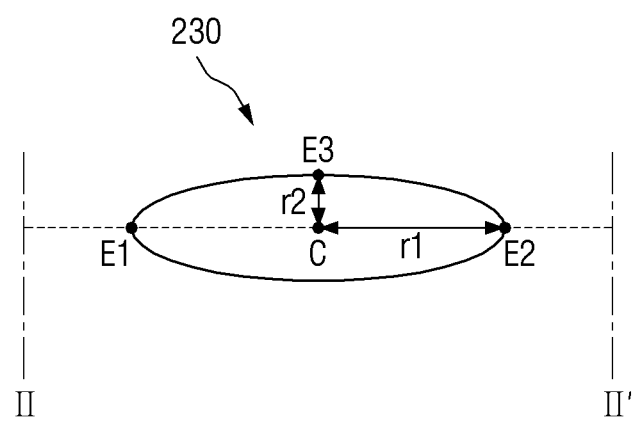
FIG. 4 is a cross-sectional view of the rod-like scatterer of FIG. 2.
Figure 5:
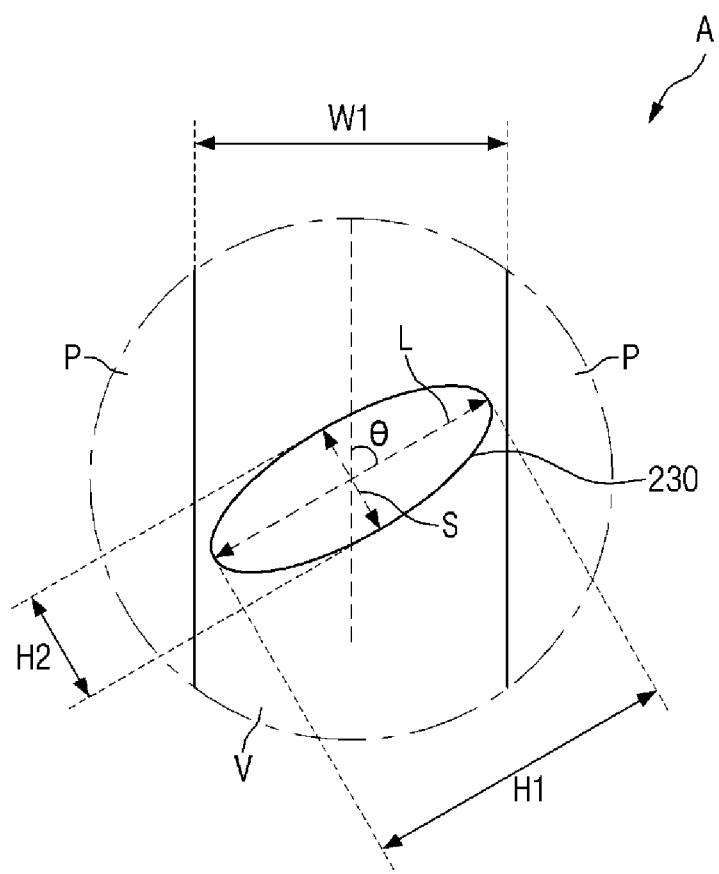
FIG. 5 is an enlarged view of area A of FIG. 2.
Figure 6A:
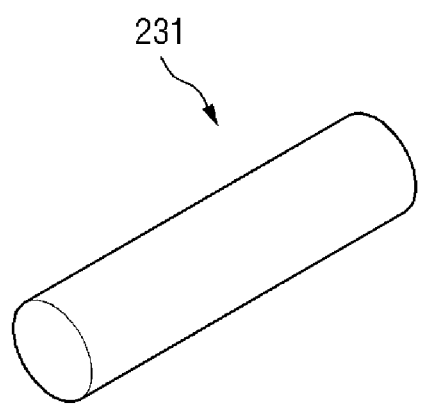
FIGS. 6A to 6C are perspective views of exemplary embodiments of rod-like scatterers constructed according to the principles of the invention.
Figure 6B:
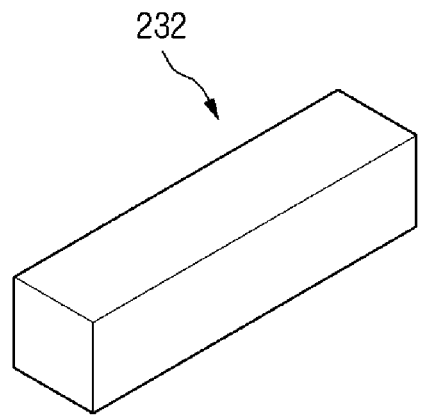
Figure 6C:
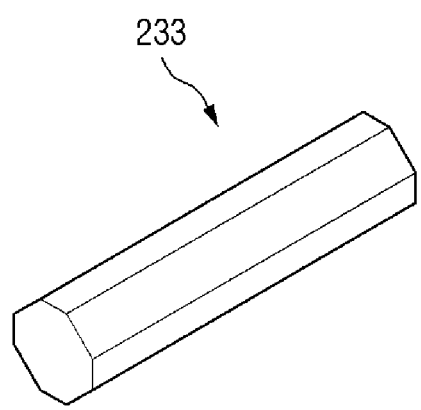

FIG. 4 is a cross-sectional view of the rod-like scatterer of FIG. 2. FIG. 5 is an enlarged view of area A of FIG. 2. FIGS. 6A to 6C are perspective views of exemplary embodiments of rod-like scatterers constructed according to the principles of the invention.

Referring to FIGS. 3 to 5, each of the rod-like scatterers 230 may have a length H1 along its longitudinal axis L and a length H2 of its shorter axis S that is different from the length H1 of the longitudinal axis L. As such, each of the rod-like scatterers 230 is elongate and has directionality.

As shown in FIG. 4, the rod-like scatterer 230 may have a needle shape. Specifically, the cross section of the rod-like scatterer 230 may be in an elliptical shape having a first radius r1 from a center C at both end points E1 and E2 and having a second radius r2 from a center C at another point E3 where the second radius r2 is less than the first radius r1. The second radius r2 may be the shortest radius of the cross section of the rod-like scatterer 230. The radius of the cross section of the rod-like scatterer 230 may decrease from the both end points E1 and E2 to the point E3. The rate of decrease of the radius may decrease from both end points E1 and E2 to the point E3.

It is, however, to be understood that the shape of the rod-like scatterer 230 is not limited thereto. For example, referring to FIG. 6A, a rod-like scatterer 231 may have a cylindrical shape with a circular cross section. Referring to FIG. 6B, a rod-like scatterer 232 may have a quadrangular column shape with a rectangular cross-section. Referring to FIG. 6C, a rod-like scatterer 233 may have an octagonal column space with an octagonal cross-section.

Referring back to FIGS. 3 to 5, the length H1 of the longitudinal axis L of the rod-like scatterer 230 may be greater than the length H2 of the shorter axis S. The length H1 of the longitudinal axis L of the rod-like scatterer 230 may be greater than the maximum width W1 of each of the valleys V of the pattern layer 210. The length H2 of the shorter axis S of the rod-like scatterer 230 may be less than the maximum width W1 of each of the valleys V of the pattern layer 210. The length H1 of the longitudinal axis L of the rod-like scatterer 230 may be less than the length H from the upper surface of the valleys V to the upper surface of the peaks P. The length H1 of the longitudinal axis L of the rod-like scatterer 230 may be less than the pitch PC between the peaks P. Accordingly, the rod-like scatterers 230 stacked in the valleys V may be easily aligned along the direction in which the valleys V of the pattern layer 210 are extended.

The rod-like scatterer 230 may be disposed generally in parallel with the longitudinally extending direction of the valleys V. It is to be noted that the longitudinal axis L of the rod-like scatterer 230 may be obliquely disposed with respect to the longitudinally extending direction of the valleys V. The angle θ formed by the longitudinal axis L of the rod-like scatterer 230 and the longitudinally extending direction of the valleys V may be from 0 to 45°. In the above range, the rod-like scatterer 230 refracts incident light having passed through the pattern layer 210 and/or the cover layer 220 to the left/right with respect to the longitudinal axis L, so that the light can be diffused more efficiently. Accordingly, it is possible to reduce the luminance loss of the display device 1 due to light exiting in an undesired direction, and to increase the left-right viewing angles with respect to the longitudinal axis L of the rod-like scatterer 230 to improve the visibility at the desired side of the display.

Referring again to FIG. 2, the cover layer 220 may be in contact with the pattern layer 210 directly and may be complementarily formed and coupled to the pattern layer 210. As used herein, the phrase "the pattern layer 210 is in contact with the cover layer 220 directly" means that no adhesive layer and/or adhesive layer is interposed between the pattern layer 210 and the cover layer 220.

After the rod-like scatterers 230 are stacked in the valleys V of the pattern layer 210, the cover layer 220 may be formed to cover the pattern layer 210 and the scatterers 230. The cover layer 220 includes a surface facing the pattern layer 210, and at least a portion of the valleys V may be filled with the cover layer 220. The phrase "at least a portion of the valleys V may be filled with the cover layer 220" includes the valleys V being filled in with the cover layer 220 either completely or partially. When the valleys V are partially filled with a filling pattern, the remaining unfilled portion may be filled with air.

The cover layer 220 may have a refractive index of less than 1.50, specifically equal to or greater than 1.35 and less than 1.50. In the above range, the light can be diffused efficiently, the device can be fabricated easily, and the visibility can be improved. The cover layer 220 may be formed of an UV-curable transparent resin having a refractive index lower than that of the resin of the pattern layer 210. Specifically, the resin may include at least one of, but is not limited to, a (meth)acrylic resin, a polycarbonate resin, a silicone resin, and an epoxy resin.

The base layer 240 may support the pattern layer 210. The base layer 240 is a light-transmitting layer, and may transmit light emitted from the backlight unit 300 to the pattern layer 210 and the cover layer 220.

The base layer 240 and the pattern layer 210 may be in contact with each other directly, and the base layer 240 and the pattern layer 210 may be formed integrally.

The base layer 240 may include one or more of: polyesters including polyethylene terephthalate (PET), polybutylene terephthalate, polyethylene naphthalate, polybutylene naphthalate and the like, cellulose esters including acrylic, cyclic olefin polymer (COP), triacetyl cellulose (TAC) and the like, and polyvinyl acetate, polyvinyl chloride (PVC), polynorbornene, polycarbonate (PC), polyamide, polyacetal, polyphenylene ether, polyphenylene sulfide, polysulfone, polyethersulfone, polyarylate and polyimide.

FIG. 7 is a diagram conceptually illustrating a light transmission axis and a path of exiting light in the display device of FIG. 1.

Referring to FIGS. 1, 2 and 7, the upper polarizing plate Pol1 is disposed on the upper surface of the display panel 100, and the lower polarizing plate Pol2 is disposed on the lower surface of the display panel 100. The lower polarizing plate Pol2 polarizes the light emitted from the backlight unit 300, and the upper polarizing plate Pol1 polarizes the light transmitted through the display panel 100. The optical film 200 for improving the viewing angle may be disposed on the upper polarizing plate Pol1.

In the following description, the up-and-down direction is defined as the direction perpendicular to the longer sides of the optical film 200 shown in FIG. 2, while the left-and-right direction is defined as the direction perpendicular to the shorter sides of the optical film 200. In other words, the up-and-down direction refers to the longitudinally extending direction of the valleys V and the peaks P, and the left-and-right direction refers to the direction perpendicular to the longitudinally extending direction of the valleys V and the peaks P.

The lower polarizing plate Pol2 may have the light transmission axis in the left-right direction. When natural light having vibration planes in all directions of 360 degrees is incident on the lower polarizing plate Pol2, it transmits only light having a certain vibration plane while absorbs the other light, so that polarized light may exit toward the display panel 100.

The upper polarizing plate Pol1 may have the light transmission axis in the up-and-down direction. After light has passed through the liquid-crystal layer 130 of the display panel 100, the light having a vibration plane parallel to the light transmission axis of the upper polarizing plate Pll may be absorbed whereas the light having a vibration plane perpendicular to the light transmission axis of the upper polarizing plate Pol1 may be transmitted.

As described above, the optical film 200 may include the pattern layer 210 in which the valleys V and the peaks P are formed repeatedly and the cover layer having the complementary shape and coupled with the pattern layer 210. The rod-like scatterers 230 may be randomly stacked in the valleys V. The direction of the longitudinal axis L of the rod-like scatterers 230 may be generally parallel to the light transmission axis of the upper polarizing plate Pol1. That is to say, the longitudinally extending direction of the valleys V and the peaks P of the pattern layer 210 may also be generally parallel to the light transmission axis of the upper polarizing plate Pol1.

Figure 8:
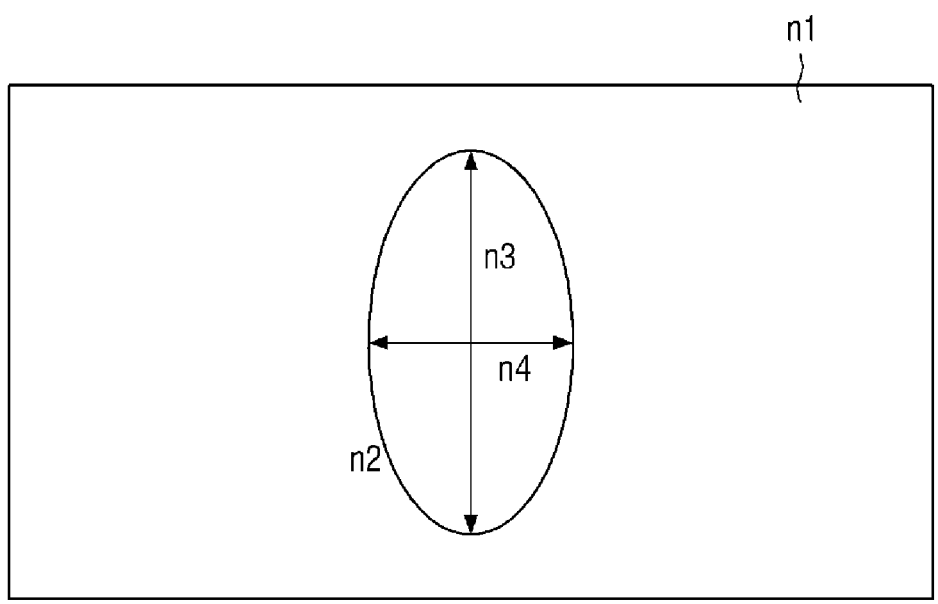
FIG. 8 is a diagram illustrating the refractive indexes of the rod-like scatterer and surrounding materials of FIG. 2.

FIG. 8 is a diagram illustrating the refractive indexes of the rod-like scatterer and surrounding materials of FIG. 2.

Referring to FIGS. 2, 5 and 8, the optical film 200 may include a pattern layer 210, a cover layer 220, and rod-like scatterers 230. The pattern layer 210 and the cover layer 220 may be defined as the surrounding materials of the rod-like scatterers 230.

The optical film 200 is characterized in that rod-like scatterers 230 having the refractive index of n2 are aligned in a particular direction in the surrounding materials having the refractive index of n1. In this instance, n2 denotes the average refractive index of the rod-like scatterers 230, and may be represented by (n3+n4)/2 where the refractive index in the longitudinal axis L direction is n3 and the refractive index in the shorter axis S direction is n4.

As described above, the rod-like scatterers 230 can have other shape such as a cylindrical shape in addition to the rod-like shape as long as they can have an elongate directionality (e.g., not perfectly spherical or square). The refractive index n3 of the rod-like scatterers 230 may be different from n1 and the refractive index n4 may be equal to or different from n1 in order to block up-and-down viewing angle and improve left-and-right viewing angle. That is to say, it is to be noted that the refractive index n3 is set different from n1.

In order to block the up-and-down viewing angles and to improve the right-and-left viewing angles, the average refractive index n2 of the rod-like scatterers 230 is different from n1. The greater the difference is, the greater the effect of blocking the up-and-down viewing angles.

As described above, by aligning the longitudinal axis (L) direction of the rod-like scatterers 230 having the refractive index of n2 in parallel with the light transmission axis of the upper polarizing plate Pol1 in the surrounding materials having the refractive index of n1, the light having passed through the upper polarizing plate Pol1 may be diffused due to the difference in refractive index between the rod-like scatterers 230 and the surrounding materials. The light having passed through the upper polarizing plate Pol1 can be diffused more in the left-and-right direction and less in the up-and-down direction with respect to the orientation because of the rod shape of the rod-like scatterers 230. As a result, it is possible to improve the visibility of the liquid-crystal display device 1 at the desired side and to reduce unnecessary loss of luminance in the up-and-down direction.

Hereinafter, the effects achieved by to the rod-like scatterers will be described with reference to FIGS. 9 to 11.

Figure 9:
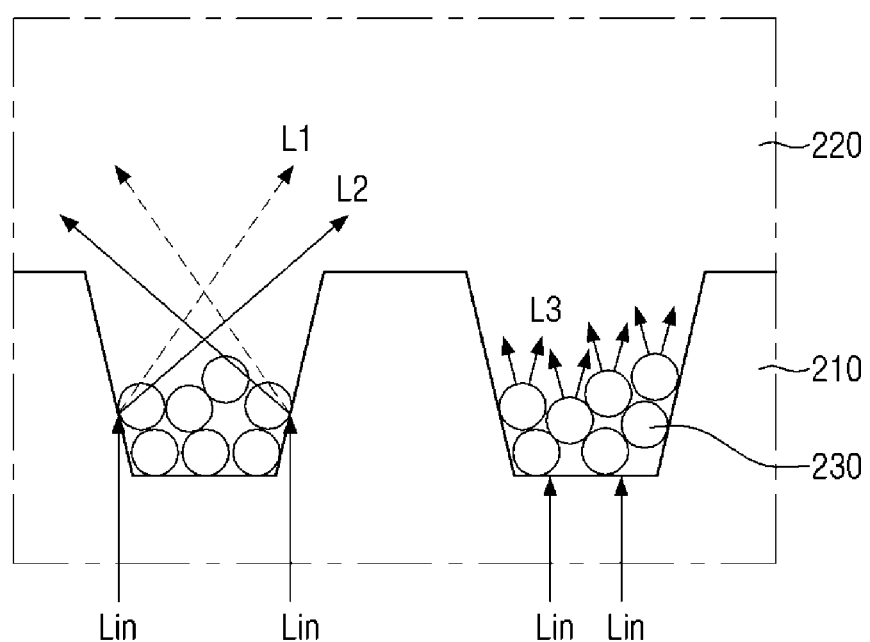
FIG. 9 is a diagram illustrating a change in the path of light passing through the patterned layer and the rod-like scatterers of FIG. 2.

FIG. 9 is a diagram illustrating a change in the path of light passing through the patterned layer and the rod-like scatterers of FIG. 2. FIG. 10 is a diagram illustrating how a diffraction pattern is generated by the optical film which does not include the rod-like scatterers.

Referring to FIG. 9, light Lin incident on the pattern layer 210 may pass through the upper surface of the valleys V of the pattern layer 210. As described above, the rod-like scatterers 230 may be randomly stacked in the valleys V. For example, the rod-like scatterers 230 may be stacked in multiple layers in the valleys V.

The light Lin incident on the pattern layer 210 may pass through the rod-like scatterers 230. Light L3 that has passed through the rod-like scatterers 230 is likely to undergo more reinforcement (constructive interference) and cancellation (destructive interference) as it goes the rod-like scatterers 230 in the traveling path, as compared with an optical film without the rod-like scatterers. Specifically, the rod-like scatterers 230 diffuse the light Lin incident on the pattern layer 210, and the rod-like scatterers 230 may randomly distribute the path difference of the light Lin. Thus, it can be expected that the probability of generating a diffraction pattern is reduced.

Figure 10:
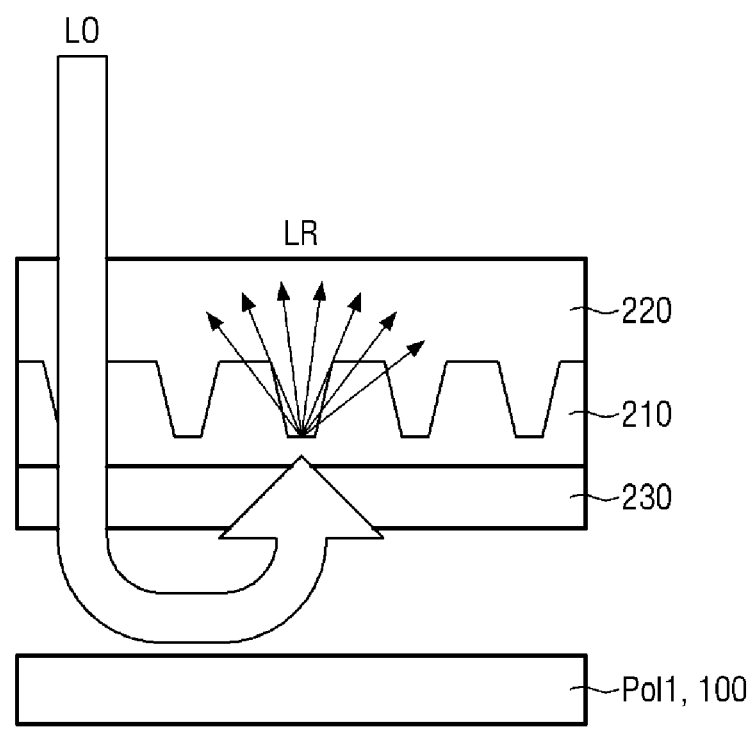
FIG. 10 is a diagram illustrating how a diffraction pattern is generated by the optical film which does not include the rod-like scatterers.

Referring to FIG. 10, a diffraction pattern phenomenon that may occur when the optical film 200 does not include the rod-like scatterers 230 will be described in more detail. The external light LO incident from the outside of the liquid-crystal display device 1 may be reflected by components of the liquid-crystal display device 1 such as the upper polarizing plate Pol1 and the display panel 100, and may exit toward the optical film 200. The optical film 200 may include the pattern layer 210 in which the valleys V and the peaks P are formed in a regular pattern. Light passing through the regular pattern may form a diffraction pattern (rainbow artifact) by diffraction phenomenon. Specifically, when light passes through the regular pattern may be bent with different wavelengths. If the same wavelength results in reinforcement (constructive interference), a color corresponding to the wavelength may be seen. If the wavelengths result in cancellation (destructive interference), a color corresponding to it may not be seen.

Referring back to FIG. 9, light Lin incident on the pattern layer 210 may pass through the interface between the pattern layer 210 and the cover layer 220. The light Lin incident on the interface between the pattern layer 210 and the cover layer 220 may be refracted in one direction due to the difference in refractive index between the pattern layer 210 and the cover layer 220. The light L1 having passed through the interface between the pattern layer 210 and the cover layer 220 travels along the path indicated by the dotted arrow when there is no rod-like scatterer 230. The light L2 having passed through the interface between the pattern layer 210 and the cover layer 220 travels along the path indicated by the solid arrow when there are the rod-like scatterers 230. Although the light L1 is also refracted in the left-and-right direction due to the valleys V and the peaks P, it can be seen that the light L2 is greatly refracted in the left-and-right direction because of the rod-like scatterers 230 as well as the valleys V and the peaks P. Thus, it can be expected that the side viewing angle of the liquid-crystal display device 1 is improved.

Figure 11:
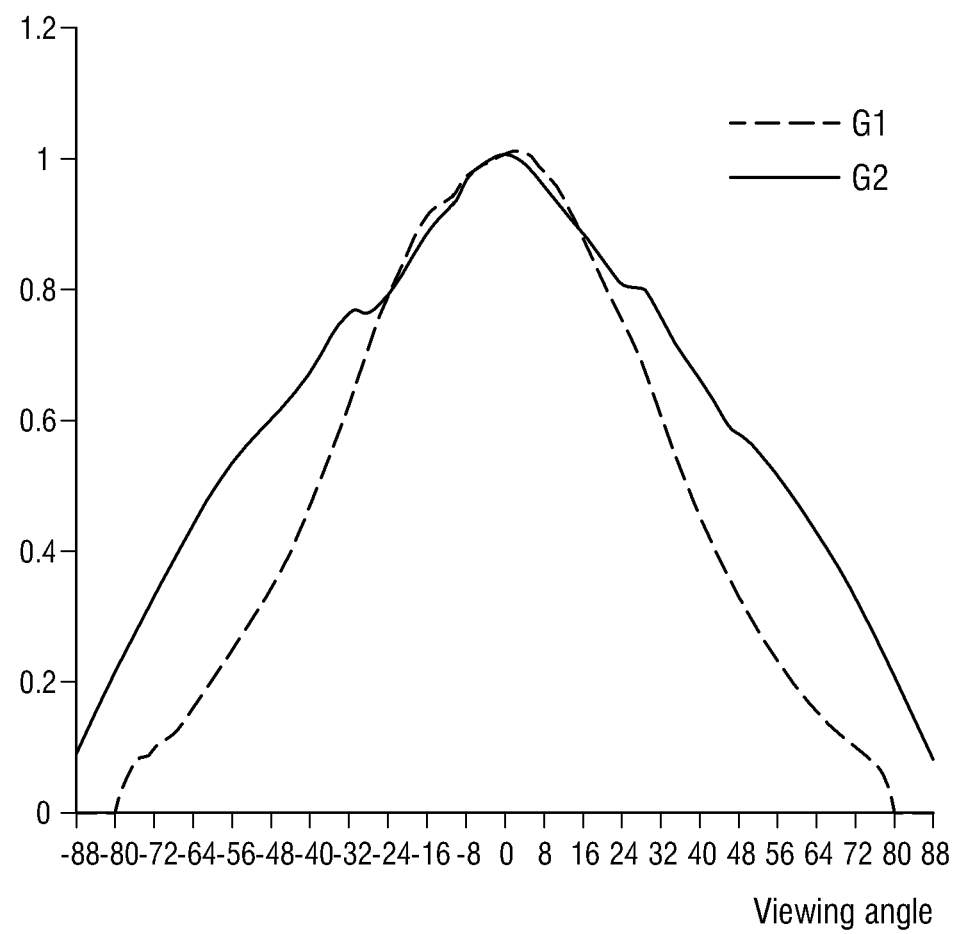
FIG. 11 is a graph illustrating luminance characteristics according to viewing angle.

FIG. 11 is a graph illustrating luminance characteristics according to viewing angle. In the graph shown in FIG. 11, the horizontal axis represents viewing angle. The front of the liquid-crystal display device may be defined as 0°, the left side may be defined as the negative direction, the right side may be defined as the positive direction, the left end point may be defined as −90°, and the right end point may be defined as +90° with reference to the horizontal direction. The vertical axis represents a relative luminance obtained by normalizing the measured luminance when the luminance is measured from −90° to +90°. The angle of the point at which the luminance measured is half of the luminance at the front may be defined as an exit angle.

The dashed curve G1 represents the luminance characteristics according to viewing angle of the optical film 200 without the rod-like scatterers 230, while the solid curve G2 represents the luminance characteristics according to viewing angle of the optical film 200 with the rod-like scatterers 230.

The exit angle of the first curve G1 may range from approximately −38° to +38°, while the exit angle of the second curve G2 may range from approximately −58° to +58°. That is to say, when the optical film 200 includes the rod-like scatterers 230 according to the above-described exemplary embodiment, the exit angle can be improved by approximately 20°.

Hereinafter, other exemplary embodiments of the optical film will be described. In the following description, the same or similar elements will be denoted by the same or similar reference numerals, and redundant descriptions will be omitted or briefly described.

FIGS. 12, 13, 14, and 15 are cross-sectional views of other exemplary embodiments of optical films constructed according to the principles of the invention. FIG. 16 is a plan view of the scattering layer of FIG. 15.

Figure 12:
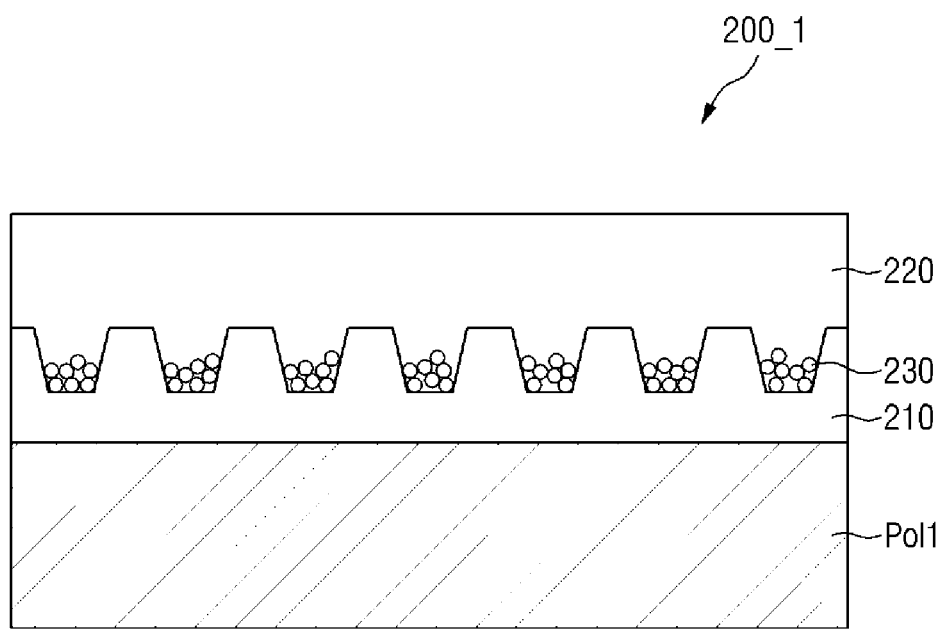
FIGS. 12, 13, 14, and 15 are cross-sectional views of other exemplary embodiments of optical films constructed according to the principles of the invention.

Referring to FIGS. 3 and 12, an optical film 200_1 is different from the optical film 200 shown in FIG. 3 in that a pattern layer 210 is formed directly on an upper polarizing plate Pol1.

More specifically, the optical film 200_1 shown in FIG. 12 may include an upper polarizing plate Pol1, a pattern layer 210, a cover layer 220, and rod-like scatterers 230.

In the optical film 200_1, the pattern layer 210 may be formed directly on the upper polarizing plate Pol1. By doing so, it is possible to reduce the thickness of the optical film 200_1, and thus it is advantageous for reducing the thickness of the liquid-crystal display device 1.

Figure 13:
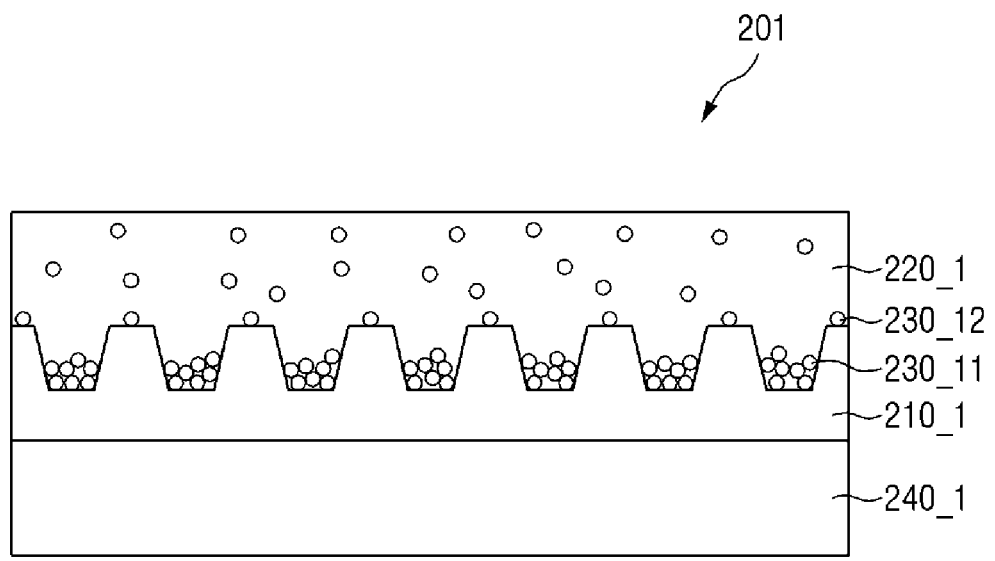

Referring to FIGS. 3 and 13, the optical film 201 is substantially identical to the optical film 200 shown in FIG. 3 except that the optical film 201 includes second rod-like scatterers 230_12 from the upper surface of the peaks P to the upper surface of the cover layer 220_1 in addition to the first rod-like scatterers 230_11 stacked in the valleys V.

More specifically, the optical film 201 shown in FIG. 13 may include a base layer 240_1, a pattern layer 210_1, a cover layer 220_1, first rod-like scatterers 230_11 and second rod-like scatterers 230_12.

The first rod-like scatterers 230_11 and the second rod-like scatterers 230_12 may be mixed with the uncured cover layer 220_1. The cover layer 220_1 mixed with the first rod-like scatterers 230_11 and the second rod-like scatterers 230_12 may be applied to cover the pattern layer 210_1. Subsequently, by applying an electric field to both ends of the valleys V and the peaks P in the longitudinally extending direction, it is possible to align them in parallel with the longitudinally extending direction. The first rod-like scatterers 230_11 and the second rod-like scatterers 230_12 are located at different positions but may have substantially the same structure and constituent material.

The cover layer 220_1 may be formed of an UV-curable transparent resin having a refractive index lower than that of the resin of the pattern layer 210_1. Specifically, the resin may include at least one of, but is not limited to, a (meth) acrylic resin, a polycarbonate resin, a silicone resin, and an epoxy resin.

As the optical film 201 includes the second rod-like scatterers 230_12 from the upper surface of the peaks P to the upper surface of the cover layer 220_1 in addition to the first rod-like scatterers 230_11 stacked in the valleys V, so that it is possible to further increase the effect achieved by the rod-like scatterers described above with reference to FIGS. 9 to 11.

Figure 14:
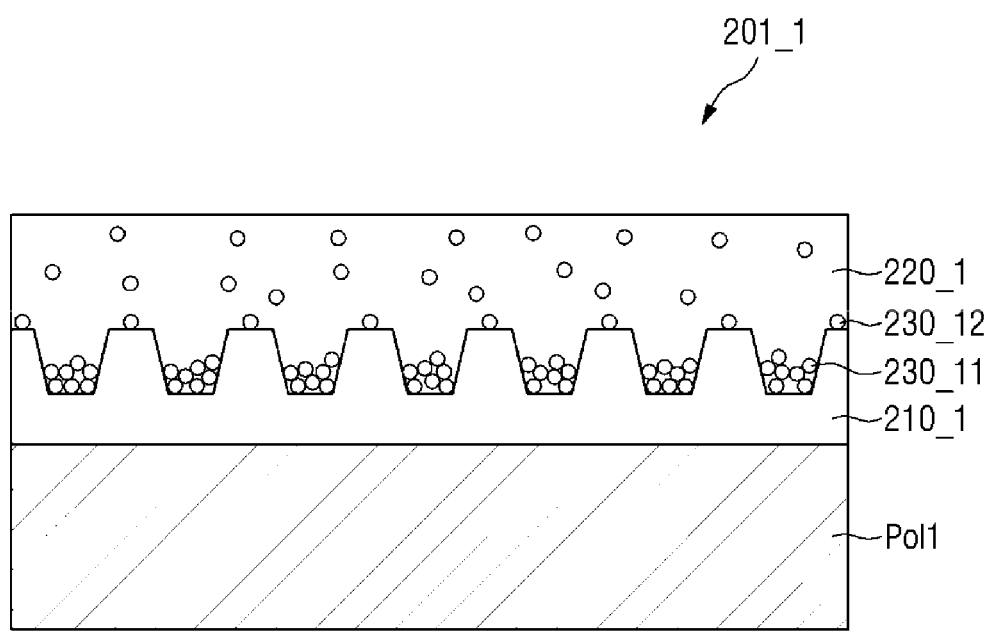

Referring to FIGS. 3, 13 and 14, an optical film 201_1 is different from the optical film 201 shown in FIG. 13 in that a pattern layer 210_1 is formed directly on an upper polarizing plate Pol1.

More specifically, the optical film 201_1 shown in FIG. 14 may include an upper polarizing plate Pol1, a pattern layer 210_1, a cover layer 220_1, first rod-like scatterers 230_11 and second rod-like scatterers 230_12.

In the optical film 201_1, the pattern layer 210_1 may be formed directly on the upper polarizing plate Pol1. By doing so, it is possible to reduce the thickness of the optical film 201_1, and thus it is advantageous for reducing the thickness of the liquid-crystal display device 1.

As the optical film 201_1 includes the second rod-like scatterers 230_12 from the upper surface of the peaks P to the upper surface of the cover layer 220_1 in addition to the first rod-like scatterers 230_11 stacked in the valleys V, so that it is possible to further increase the effect achieved by the rod-like scatterers described above with reference to FIGS. 9 to 11.

Referring to FIGS. 3, 8, 15 and 16, the optical film 202 is different from the optical film 200 shown in FIG. 3 in that it further includes a scattering layer 243.

Figure 15:
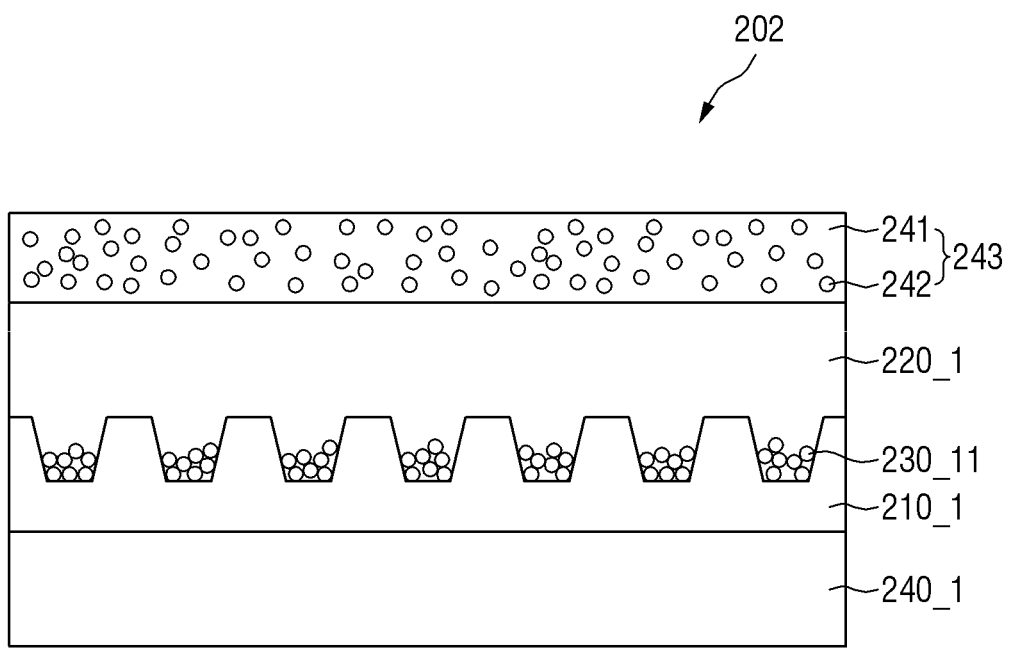
Figure 16:
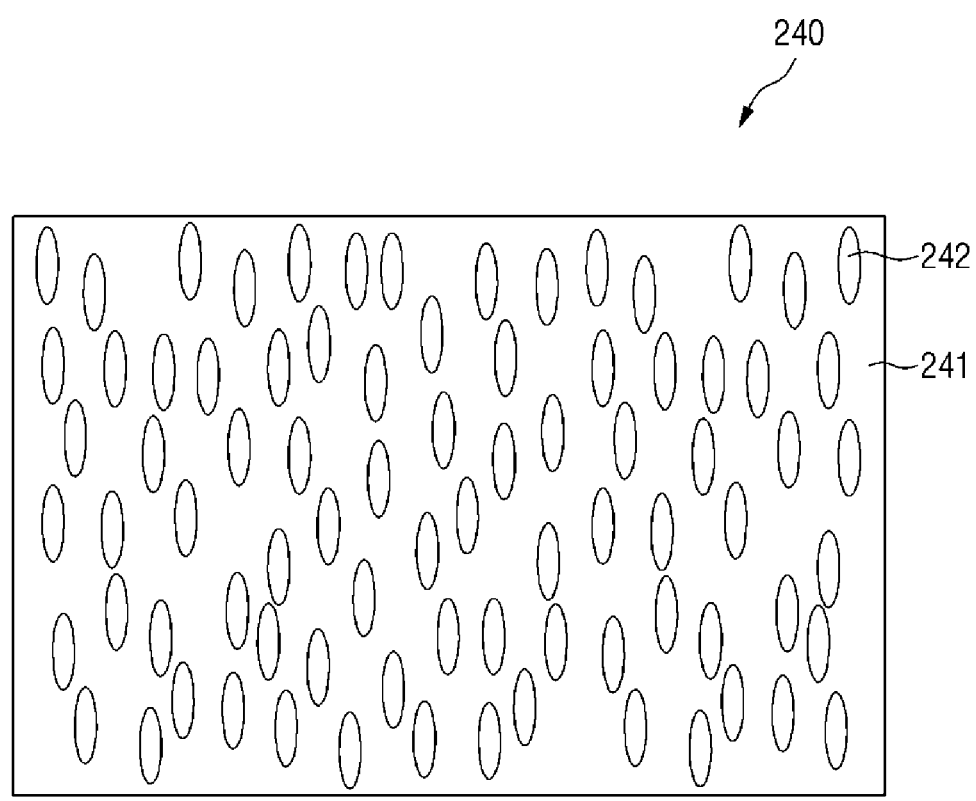
FIG. 16 is a plan view of the scattering layer of FIG. 15.

More specifically, the optical film 202 shown in FIG. 15 may include a base layer 240_1, a pattern layer 210_1, a cover layer 220_1, first rod-like scatterers 230_11, and a scattering layer 240. The scattering layer 240 may include a resin layer 241 and third rod-like scatterers 242.

The scattering layer 240 is characterized in that third rod-like scatterers 242 having the refractive index of n2 are aligned in a particular direction in the resin layer 241 having the refractive index of n1. In this instance, n2 denotes the average refractive index of the rod-like scatterers 242, and may be represented by (n3+n4)/2 where the refractive index in the longitudinal axis L direction is n3 and the refractive index in the shorter axis S direction is n4.

The third rod-like scatterers 242 can have other shapes such as a cylindrical shape in addition to the rod-like shape as long as they can have an elongate directionality. The refractive index n3 of the rod-like scatterers 242 may be different from n1 and the refractive index n4 may be equal to or different from n1 in order to block up-and-down viewing angle and improve left-and-right viewing angle. That is to say, it is to be noted that the refractive index n3 set different from n1.

In order to block the up-and-down viewing angles and to improve the right-and-left viewing angles, the average refractive index n2 of the third rod-like scatterers 242 is different from n1. The greater the difference is, the greater the effect of blocking the up-and-down viewing angles.

As described above, by aligning the longitudinal axis (L) direction of the third rod-like scatterers 242 having the refractive index of n2 in parallel with the light transmission axis of the upper polarizing plate Pol1 in the resin layer 241 having the refractive index of n1, the light having passed through the cover layer 220_1 may be diffused to the left and right due to the difference in refractive index between the third rod-like scatterers 242 and the resin layer 241.

The third rod-like scatterers 242 may be mixed with the uncured resin layer 241. The resin layer 241 mixed with the third rod-like scatterers 242 may be applied to cover the cover layer 220_1. Subsequently, by applying an electric field to both ends of the valleys V and the peaks P in the longitudinally extending direction, it is possible to align them in parallel with the longitudinally extending direction. The first rod-like scatterers 230_11 and the third rod-like scatterers 242 are located at different positions but may have the same structure and constituent material.

The resin layer 241 may be formed of an UV-curable transparent resin having a refractive index lower than that of the resin of the pattern layer 210_1. Specifically, the resin may include at least one of, but is not limited to, a (meth) acrylic resin, a polycarbonate resin, a silicone resin, and an epoxy resin.

FIGS. 17, 18, 19, 20, and 21 are cross-sectional views of still other exemplary embodiments of optical films constructed according to the principles of the invention.

Figure 17:
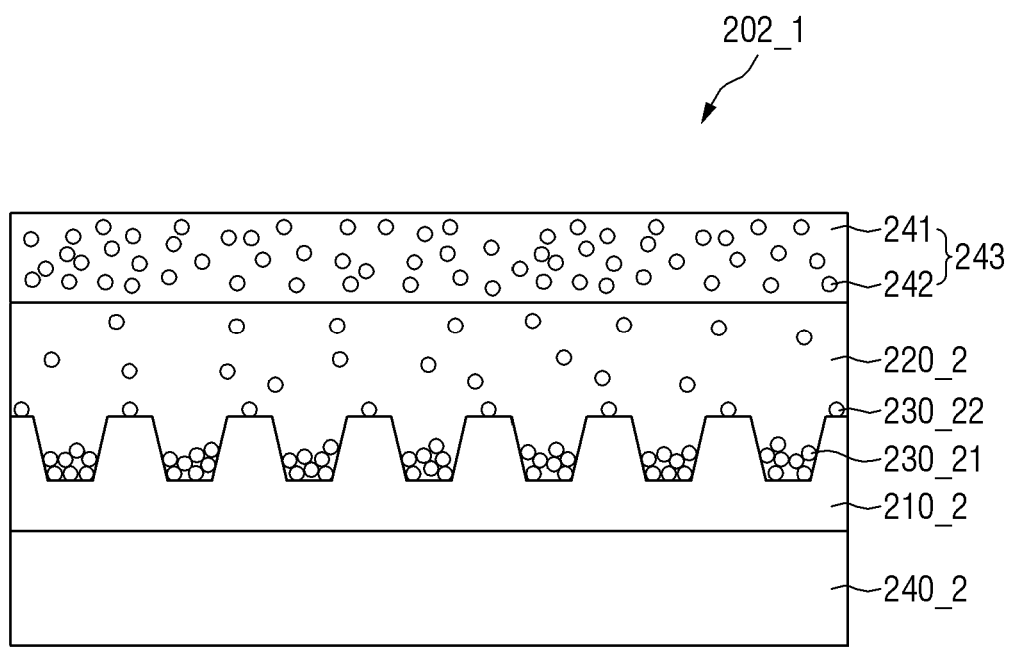
FIGS. 17, 18, 19, 20, and 21 are cross-sectional views of still other exemplary embodiments of optical films constructed according to the principles of the invention.

Referring to FIGS. 3, 15 and 17, the optical film 202_1 is substantially identical to the optical film 202 shown in FIG. 15 except that the optical film 202_1 includes second rod-like scatterers 230_22 from the upper surface of the peaks P to the upper surface of the cover layer 220_2 in addition to the first rod-like scatterers 230_21 stacked in the valleys V.

More specifically, the optical film 202_1 shown in FIG. 17 may include a base layer 240_2, a pattern layer 210_2, a cover layer 220_2, first rod-like scatterers 230_21, second rod-like scatterers 230_22 and a scattering layer 243. The scattering layer 243 may include a resin layer 241 and third rod-like scatterers 242.

Figure 18:
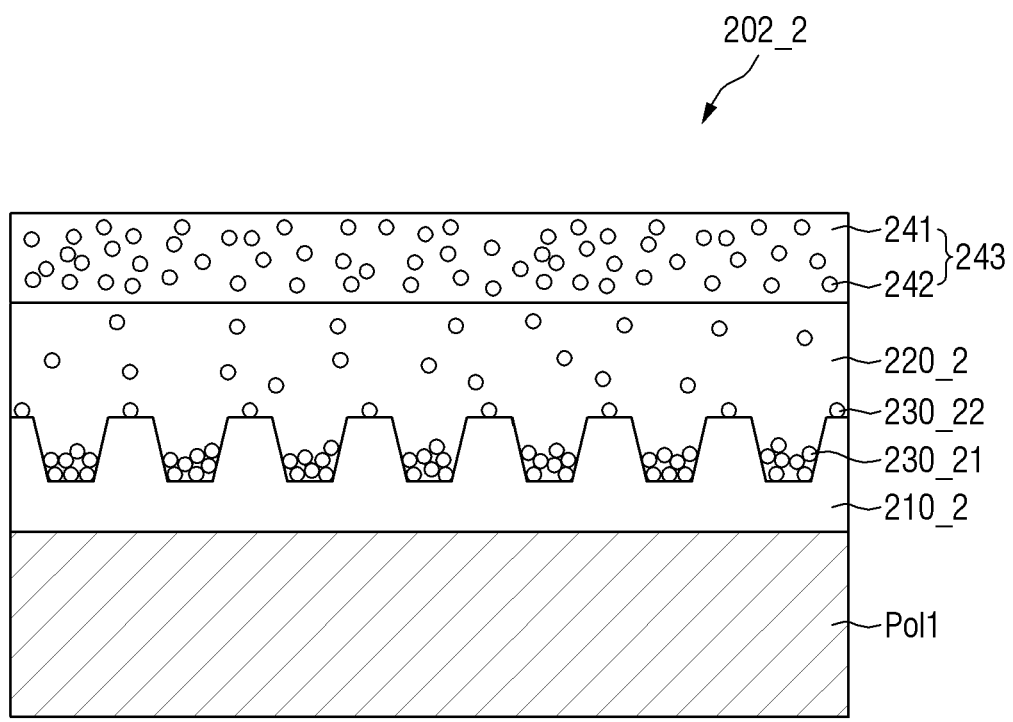

Referring to FIGS. 3, 17 and 18, an optical film 202_2 is different from the optical film 202_1 shown in FIG. 17 in that a pattern layer 210_2 is formed directly on an upper polarizing plate Pol1.

More specifically, the optical film 202_2 shown in FIG. 18 may include an upper polarizing plate Pol1, a pattern layer 210_2, a cover layer 220_2, first rod-like scatterers 230_21, second rod-like scatterers 230_22 and a scattering layer 243. The scattering layer 243 may include a resin layer 241 and third rod-like scatterers 242.

Figure 19:
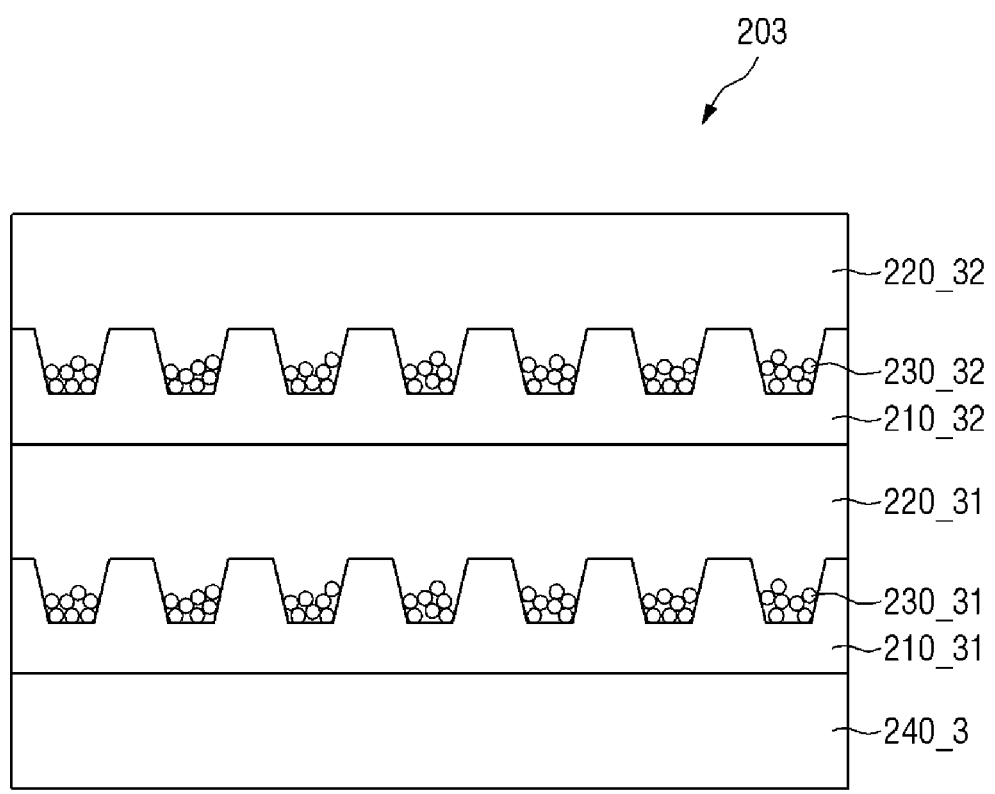

Referring to FIGS. 3 and 19, an optical film 203 is different from the optical film 200 shown in FIG. 3 in that the optical film 203 further includes a second pattern layer 210_32, a second cover layer 220_32 and third rod-like scatterers 230_32.

More specifically, a first pattern layer 210_31 may be formed on a base layer 240_3. Subsequently, rod-like, first scatterers 230_31 are stacked in the valleys V of the first pattern layer 210_31, and then the first cover layer 220_31 is applied to cover the first pattern layer 210_31 and the scatterers 230_31. Subsequently, rod-like, third scatterers 230_32 are stacked in the valleys V of the second pattern layer 210_32, and then the second cover layer 220_32 is applied to cover the second pattern layer 210_32 and the second scatterers 230_32.

Figure 20:
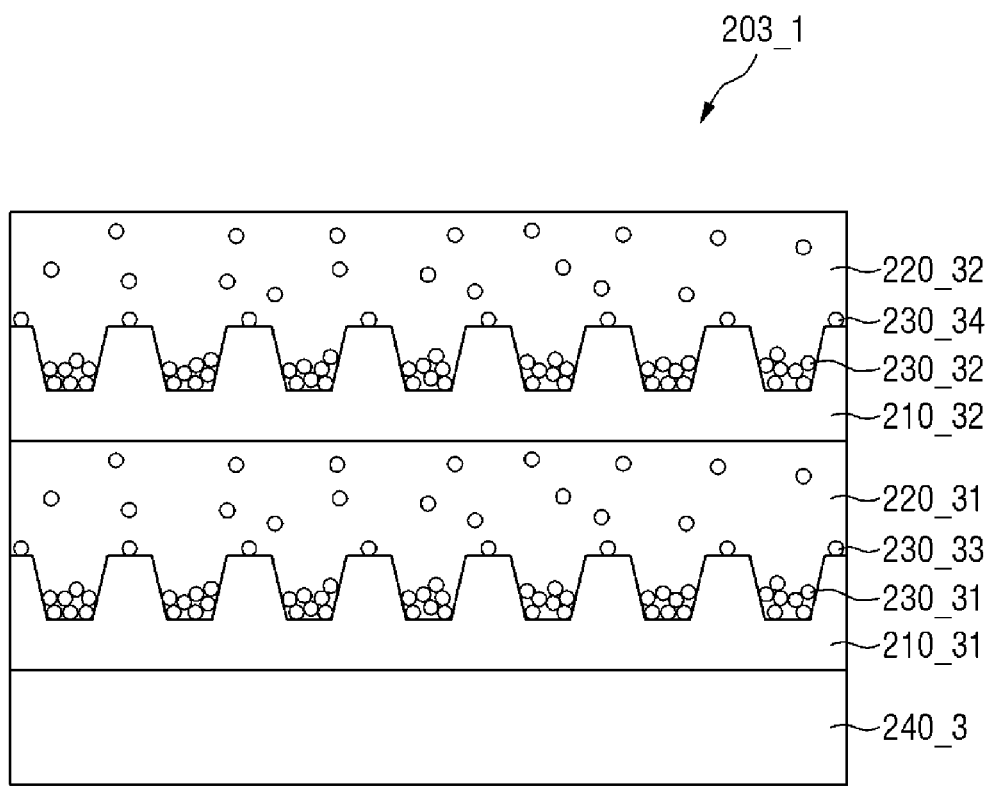

Referring to FIGS. 3, 19 and 20, an optical film 203_1 is different from the optical film 203 shown in FIG. 19 in that it includes second rod-like scatterers 230_33 from the upper surface of the peaks P of the first pattern layer 210_31 to the upper surface of the first cover layer 220_31 in addition to the first rod-like scatterers 230_31 stacked in the valleys V of the first pattern layer 210_31, and includes fourth rod-like scatterers 230_34 from the upper surface of the peaks P of the second pattern layer 210_32 to the upper surface of the second cover layer 220_32 in addition to the third rod-like scatterers 230_32 stacked in the valleys V of the second pattern layer 210_32.

Figure 21:
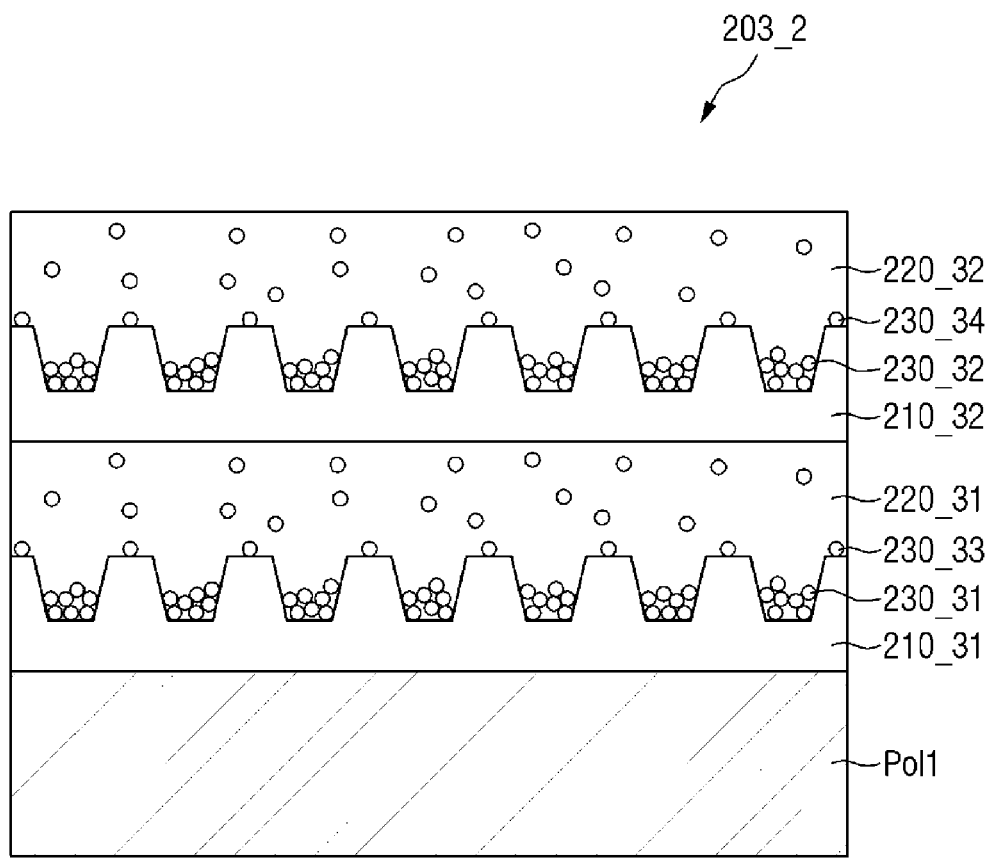

Referring to FIGS. 3, 20 and 21, an optical film 203_2 is different from the optical film 203_1 shown in FIG. 20 in that a first pattern layer 210_31 is formed directly on an upper polarizing plate Pol1.

More specifically, the optical film 203_2 may include a first polarizing plate Pol1, a first pattern layer 210_31, first rod-like scatterers 230_31, second rod-like scatterers 230_33, a first cover layer 220_31, a second pattern layer 210_32, third rod-like scatterers 230_32, fourth rod-like scatterers 230_34, and a second cover layer 220_32.

Figure 22:
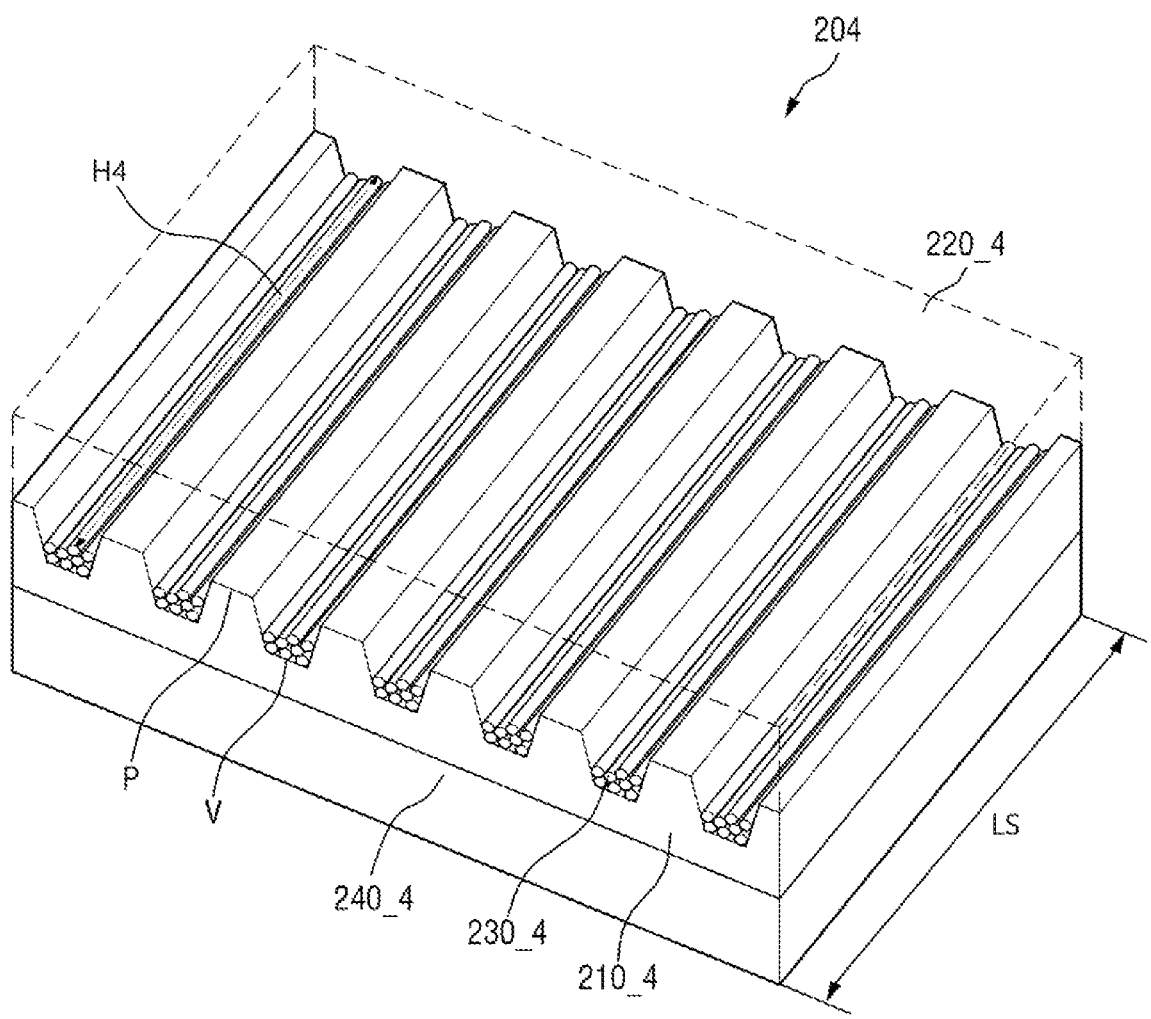
FIG. 22 is a perspective view of another exemplary embodiment of an optical film constructed according to the principles of the invention.

FIG. 22 is a perspective view of another exemplary embodiment of an optical film constructed according to the principles of the invention.

Referring to FIGS. 1, 2, 7 and 22, an optical film 204 is different from the optical film 200 shown in FIG. 2 in that the length H4 of the longitudinal axis of the rod-like scatterers 230_4 is substantially identical to the length LS of the shorter side of the optical film 204.

More specifically, the optical film 204 may include a base layer 240_4, a pattern layer 210_4, a cover layer 220_4, and rod-like scatterers 230_4.

The optical film 204 may include a pattern layer 210_4 in which the valleys V and the peaks P are formed repeatedly and a cover layer 220_4 having the complementary shape and coupled with the pattern layer 210_4. The rod-like scatterers 230_4 may be uniformly stacked in the valleys V. The direction of the longitudinal axis L of the rod-like scatterers 230_4 may be parallel to the light transmission axis of the upper polarizing plate Pol1. That is to say, the longitudinally extending direction of the valleys V and the peaks P of the pattern layer 210_4 may also be parallel to the light transmission axis of the upper polarizing plate Pol1.

It is to be understood that the optical film shown in FIG. 22 can be applied to the optical films shown in FIGS. 12 to 21.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. An optical film for a display device, the optical film comprising:
   a base layer;

a pattern layer disposed on the base layer and having a repeating pattern of valleys and peaks;
a plurality of first elongated scattering members disposed on upper surfaces of the valleys; and
a cover layer having a shape that is complementary to and coupled with the repeating pattern of valleys and peaks, with the elongated scattering members being disposed between the pattern layer and the cover layer,
wherein the elongated scattering members have a longitudinal axis whose length is different from a length of a shorter axis thereof, and
wherein the elongated scattering members have a refractive index in a direction of the longitudinal axis that is different from that of at least one of the pattern layer and the cover layer.

2. The optical film of claim 1, wherein each of the peaks has a width equal to or greater than a width of each of the valleys, and wherein the pattern layer has a refractive index higher than a refractive index of the cover layer.

3. The optical film of claim 1, wherein the elongated scattering members comprise first rod-like scatterers having elliptical cross sectional shapes.

4. The optical film of claim 1, wherein the length of the shorter axis of the elongated scattering members is less than a width of each of the valleys.

5. The optical film of claim 1, wherein the refractive index of the elongated scattering members is less than a refractive index of the pattern layer.

6. The optical film of claim 1, wherein the cover layer further comprises second elongated scattering members, and wherein the second elongated scattering members are disposed in a region extending from upper surfaces of the peaks to an upper surface of the cover layer.

7. The optical film of claim 6, wherein the second elongated scattering members have a longitudinal axis whose length is different from a length of a shorter axis of the second elongated scattering members.

8. The optical film of claim 7, wherein the longitudinal axis of the second elongated scattering members is disposed generally parallel to a longitudinally extending direction of the valleys.

9. The optical film of claim 7, wherein the second elongated scattering members have a refractive index in a direction of the longitudinal axis that is different from that of the cover layer.

10. An optical film for a display device, the optical film comprising:
a base layer;
a pattern layer disposed on the base layer and having a repeating pattern of valleys and peaks;
a plurality of first elongated scattering members disposed on upper surfaces of the valleys; and
a cover layer having a shape that is complementary to and coupled with the repeating pattern of valleys and peaks, with the elongated scattering members being disposed between the pattern layer and the cover layer,
wherein the elongated scattering members have a longitudinal axis whose length is different from a length of a shorter axis thereof, and the longitudinal axis of the elongated scattering members is disposed generally parallel to a longitudinally extending direction of the valleys.

11. A display device comprising:
a display panel;
a first polarizing plate disposed on an upper surface of the display panel;
a second polarizing plate disposed on a lower surface of the display panel;
a backlight unit disposed to transmit light to the second polarizing plate; and
an optical film disposed on the first polarizing plate,
wherein the optical film comprises:
a pattern layer disposed on the first polarizing plate and having a repeating pattern of valleys and peaks,
a plurality of first elongated scattering members disposed on upper surfaces of the valleys, and
a cover layer having a shape complementary to and coupled with the pattern layer, with the plurality of first elongated scattering members being disposed between the pattern layer and the cover layer,
wherein the first elongated scattering members have a longitudinal axis whose length is different from a length of a shorter axis thereof, and
wherein the first elongated scattering members have a refractive index in a direction of the longitudinal axis that is different from that of at least one of the pattern layer and the cover layer.

12. The display device of claim 11, wherein the first polarizing plate comprises a light transmission axis in a first direction, and wherein the second polarizing plate comprises a light transmission axis in a second direction intersecting the first direction.

13. The display device of claim 12, wherein the longitudinal axis of the first elongated scattering members is generally parallel to the light transmission axis of the first polarizing plate in the first direction.

14. The display device of claim 11, wherein the longitudinal axis of the first elongated scattering members is disposed generally parallel to a longitudinally extending direction of the valleys.

15. The display device of claim 11, further comprising a scattering layer including second elongated scattering members and a resin layer on the cover layer.

16. The display device of claim 15, wherein the second elongated scattering members have a longitudinal axis whose length is different from a length of a shorter axis thereof, and wherein the second elongated scattering members have a refractive index in a direction of the longitudinal axis that is different from a refractive index of the resin layer.

* * * * *

UNITED STATES PATENT AND TRADEMARK OFFICE
CERTIFICATE OF CORRECTION

| | |
|---|---|
| PATENT NO. | : 11,320,686 B2 |
| APPLICATION NO. | : 16/837977 |
| DATED | : May 3, 2022 |
| INVENTOR(S) | : Kim et al. |

It is certified that error appears in the above-identified patent and that said Letters Patent is hereby corrected as shown below:

On the Title Page

Item (72) Inventors, correct the address of second inventor by deleting "Anyang-si (KR)" and inserting therefor -- Asan-si (KR) --.

Signed and Sealed this
Twenty-seventh Day of June, 2023

Katherine Kelly Vidal
*Director of the United States Patent and Trademark Office*